United States Patent
He et al.

(10) Patent No.: US 8,285,345 B2
(45) Date of Patent: Oct. 9, 2012

(54) MOBILE TERMINAL AND METHOD FOR SWITCHING STATES THEREOF

(75) Inventors: Zhiqiang He, Beijing (CN); Chunhui Sun, Beijing (CN); Xiaoxia Liang, Beijing (CN); Wenying Shan, Beijing (CN); Rihui Tian, Beijng (CN)

(73) Assignee: Lenovo (Beijing) Limited, Beijing (CN)

( * ) Notice: Subject to any disclaimer, the term of this patent is extended or adjusted under 35 U.S.C. 154(b) by 301 days.

(21) Appl. No.: 12/549,709

(22) Filed: Aug. 28, 2009

(65) Prior Publication Data

US 2010/0056209 A1 Mar. 4, 2010

(30) Foreign Application Priority Data

Sep. 1, 2008 (CN) .......................... 2008 1 0119485

(51) Int. Cl.
*H04M 1/00* (2006.01)
*H04B 1/38* (2006.01)
*H04B 1/04* (2006.01)
*H01Q 11/12* (2006.01)
*G08B 5/22* (2006.01)
*H04Q 1/30* (2006.01)

(52) U.S. Cl. .................. 455/574; 455/572; 455/127.5; 455/550.1; 340/7.32

(58) Field of Classification Search .................. 455/522, 455/572, 573, 574, 127.5, 343.1, 343.2, 343.3, 455/343.4, 343.5, 343.6; 370/311, 312, 318, 370/345; 340/7.1, 7.32, 7.33, 7.34, 7.36
See application file for complete search history.

(56) References Cited

U.S. PATENT DOCUMENTS

| 2004/0121797 A1* | 6/2004 | Gupta ........................ 455/550.1 |
| 2004/0192412 A1* | 9/2004 | Ono et al. ...................... 455/574 |
| 2004/0204050 A1* | 10/2004 | Krishnan et al. ........... 455/556.1 |

FOREIGN PATENT DOCUMENTS

CN 101090550 A 12/2007

* cited by examiner

*Primary Examiner* — Ariel Balaoing
*Assistant Examiner* — Christopher Kohlman
(74) *Attorney, Agent, or Firm* — Dickstein Shapiro LLP (57) ABSTRACT

A mobile terminal and method for switching states thereof are disclosed. The mobile terminal comprises a communication processor and an application processor, wherein a state in which only the communication processor is in control is defined as a second state, a state in which both the application processor and the communication processor operate and the application processor is in control is defined as a first state, the method comprising: obtaining, in the second state, trigger information corresponding to an event set; and switching the mobile terminal from the second state to the first state based on the trigger information. The mobile terminal according to the present invention can switch to a state in which only the communication processor is in control by obtaining the trigger information corresponding to an event set. In such a state, the system power consumption caused by the application processor can be effectively reduced, since the operation does not rely on the application processor and the processing functions of the communication processor can be utilized alone.

11 Claims, 5 Drawing Sheets

MOBILE TERMINAL AND METHOD FOR SWITCHING STATES THEREOF

FIELD OF THE INVENTION

The present invention relates to the field of communication technology, particularly to a mobile terminal and method for switching states thereof.

BACKGROUND OF THE INVENTION

A smart phone is an intelligent mobile terminal incorporating functions of Personal Digital Assistant (PDA) and enabling the user to browse web pages and to send/receive e-mails. The smart phone can provide functions in addition to voice communication and facilitate provision of value-added services by telecommunication operators. In implementing these functions, the smart phone adopts an architecture in which an application processor and a communication processor are incorporated and the communication processor serves as a peripheral device of the application processor. Accordingly, functions like playing audio/video, reading and processing documents are performed by the application processor, and the communication processor provides the application processor with communication paths to implement communication functions. Therefore, the smart phone can operate either in an operation mode in which the application processor and the communication processor cooperate or in an operation mode in which only the application processor operates. In this way, users' demands on both mobile computing capability and communication can be satisfied.

Figure 1:
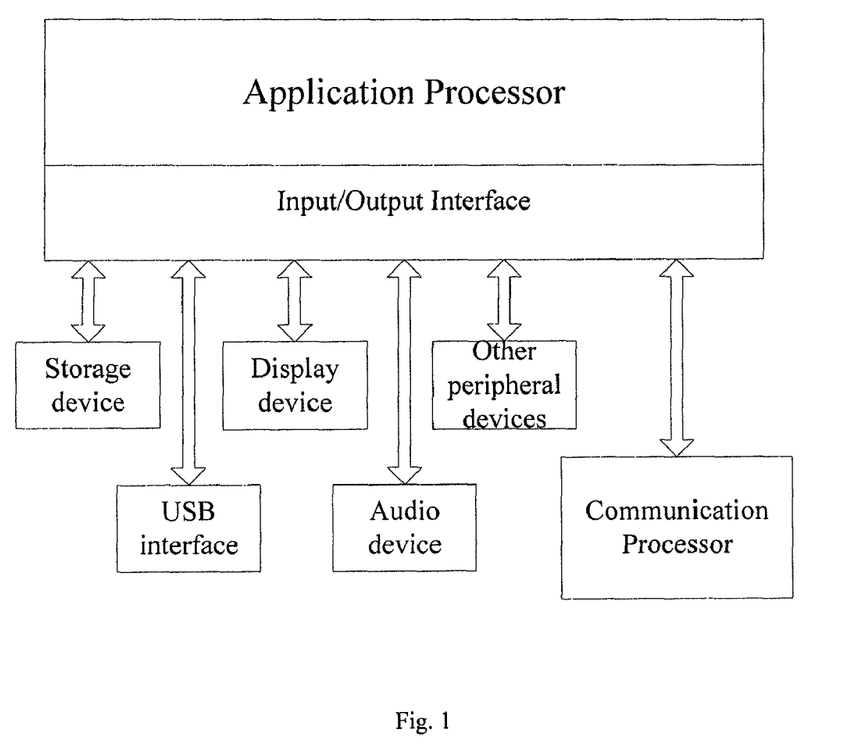
FIG. 1 is a schematic diagram illustrating the architecture of a conventional smart mobile terminal.

FIG. 1 is a schematic diagram illustrating the architecture of an existing smart mobile terminal. The smart mobile terminal based on this architecture is designed to have an application processor (AP) as its master device. In addition, an storage, a USB interface for connecting a keyboard and a mouse, a display device (a LCD with T/P), an audio device and other peripheral devices (such as WiFi/BT/GPS) are each connected with the AP via an Input/Output (I/O) interface. The communication processor (CP) is also connected, via the I/O interface, with the AP as its peripheral device. It can be seen from the above architecture of the smart mobile terminal that, in the conventional techniques, the CP is configured as a peripheral device of the AP and thus can only operate in an operation state at the same time as the AP, i.e., it cannot operate alone and independently. The power consumption for the AP is much higher than that for the CP. Also, with the increasing computing/processing capability of the CP, when the smart mobile terminal only needs to perform communication functions (i.e., only the CP functions are required), it may result in great redundant power consumption, because the AP has to be started up as the master device prior to using the CP functions according to the existing architecture.

SUMMARY OF THE INVENTION

The present invention provides a mobile terminal and method for switching states thereof, in order to address the problem of excessive power consumption of a conventional mobile terminal in which all operations modes of the mobile terminal depends on the application processor.

To address the above technical problem, the embodiments of present invention provide the following technical solutions.

A method for switching states of a mobile terminal, the mobile terminal comprising a communication processor and an application processor, wherein a state in which only the communication processor is in control is defined as a second state, and a state in which both the application processor and the communication processor operate and the application processor is in control is defined as a first state, the method comprising:

obtaining, in the second state, trigger information corresponding to an event set; and switching the mobile terminal from the second state to the first state based on the trigger information.

The method further comprises a step of entering, by the mobile terminal, the second state after initial power on.

The trigger information corresponding to the event set comprises a request to switch to the first state by interaction on a man machine interface, a receipt of a mail or a trigger of a flip operation; and the step of switching the mobile terminal from the second state to the first state based on the trigger information comprises:

determining that the operation state indicated by the trigger information corresponding to the event set is the first state; and turning on the application processor, setting the communication processor as a slave device of the application processor, and switching from an input/output device controlled by the communication processor to an input/output device controlled by the application processor.

The input/output device controlled by the application processor and the input/output device controlled by the communication processor are multiplexed input/output device, partially multiplexed input/output device, or input/output devices independent of each other.

A state in which only the application processor is in control is defined as a third state, and the method further comprises:

in the first state, when an event set is obtained in which switching to the third state is requested by interaction on a man machine interface, determining that the operation state indicated by the trigger information corresponding to the event set is the third state; and turning off the communication processor.

The method further comprises:

in the third state, when an event set is obtained in which switching to the first state is requested by interaction on a man machine interface, determining that the operation state indicated by the trigger information corresponding to the event set is the first state; and turning on the communication processor and setting the communication processor as a slave device of the application processor.

A state in which an extension means including a peripheral device interface is connected and the application processor is in control is defined as a fourth state, and the method further comprises:

in the first state or the third state, when an event set is detected in which the extension means is connected, determining that the operation state indicated by the trigger information corresponding to the event set is the fourth state; and controlling, by the application processor, a peripheral device connected by the extension means via the peripheral device interface.

A method for switching states of a mobile terminal, the mobile terminal comprising a communication processor and an application processor, wherein a state in which only the communication processor is in control is defined as a second state, and a state in which both the application processor and the communication processor operate and the application processor is in control is defined as a first state, the method comprising:

obtaining, in the first state, trigger information corresponding to an event set; and switching the mobile terminal from the first state to the second state based on the trigger information.

The trigger information corresponding to the event set comprises a request to switch to the second state by interaction on a man machine interface, or a determination that a timer exceeds a threshold; and the step of switching the mobile terminal from the first state to the second state based on the trigger information comprises:

determining that the operation state indicated by the trigger information corresponding to the event set is the second state; and turning off the application processor, setting the communication processor as a master device, and switching from an input/output device controlled by the application processor to an input/output device controlled by the communication processor.

The input/output device controlled by the application processor and the input/output device controlled by the communication processor are multiplexed input/output device, partially multiplexed input/output device, or input/output devices independent of each other.

A mobile terminal comprising:

a communication processor;

an application processor;

a first obtaining unit for obtaining trigger information corresponding to an event set in a second state; and a first control unit for controlling the mobile terminal to switch from the second state to a first state based on the trigger information;

wherein a state in which only the communication processor is in control is defined as the second state, and a state in which both the application processor and the communication processor operate and the application processor is in control is defined as the first state.

The mobile terminal further comprises:

an initializing unit for initializing the mobile terminal to enter the second state after initial power on.

The first control unit comprises:

a first determining unit for, in the second state, when an event set comprises a request to switch to the first state by interaction on a man machine interface, a receipt of a mail or a trigger of a flip operation, determining that the operation state indicated by the trigger information corresponding to the event set is the first state; and a first switching unit for turning on the application processor, setting the communication processor as a slave device of the application processor, and switching from an input/output device controlled by the communication processor to an input/output device controlled by the application processor.

A state in which only the application processor is in control is defined as a third state, the first control unit further comprising:

a second determining unit for, in the first state, when an event set is obtained in which switching to the third state is requested by interaction on a man machine interface, determining that the operation state indicated by the trigger information corresponding to the event set is the third state; and a second switching unit for turning off the communication processor.

The first control unit further comprises:

a third determining unit for, in the third state, when an event set is obtained in which switching to the first state is requested by interaction on a man machine interface, determining that the operation state indicated by the trigger information corresponding to the event set is the first state; and a third switching unit for turning on the communication processor and setting the communication processor as a slave device of the application processor.

A state in which an extension means including a peripheral device interface is connected and the application processor is in control is defined as a fourth state, the first control unit further comprising:

a fourth determining unit for, in the first state or the third state, when an event set is detected in which the extension means is connected, determining that the operation state indicated by the trigger information corresponding to the event set is the fourth state; and a fourth switching unit for controlling, by the application processor, a peripheral device connected by the extension means via the peripheral device interface.

A mobile terminal comprising:

a communication processor;

an application processor;

a second obtaining unit for obtaining trigger information corresponding to an event set in a first state; and a second control unit for controlling the mobile terminal to switch from the first state to a second state based on the trigger information;

wherein a state in which only the communication processor is in control is defined as the second state, and a state in which both the application processor and the communication processor operate and the application processor is in control is defined as the first state.

The second control unit comprises:

a determining unit for, in the first state, when an event set comprises a request to switch to the second state by interaction on a man machine interface or a determination that a timer exceeds a threshold, determining that the operation state indicated by the trigger information corresponding to the event set is the second state; and a switching unit for turning off the application processor, setting the communication processor as a master device, and switching from an input/output device controlled by the application processor to an input/output device controlled by the communication processor.

With the above technical solutions of the present invention, the mobile terminal according to the present invention can switch to a state in which only the communication processor is in control by obtaining the trigger information corresponding to an event set. In such a state, the waste of system power consumption caused by the application processor can be effectively reduced, since the operation does not rely on the application processor and the processing functions of the communication processor can be utilized alone.

DETAILED DESCRIPTION OF THE PREFERRED EMBODIMENTS

The embodiments of the present invention provide a mobile terminal and method for switching states thereof. A detailed description of the present invention will be given below in conjunction with the drawings and embodiments to facilitate better understanding of the present invention, such that the above objects, features and advantages of the present invention will become more apparent to those skilled in the art.

According to the embodiments of the present invention, a mobile terminal comprises a communication processor and an application processor. The operation states of the mobile terminal comprise: a first state in which both the application processor and the communication processor operate and the application processor is in control; a second state in which only the communication processor is in control; a third state in which only the application processor is in control; and a fourth state in which an extension means including a peripheral device interface is connected and the application processor is in control.

Figure 2:
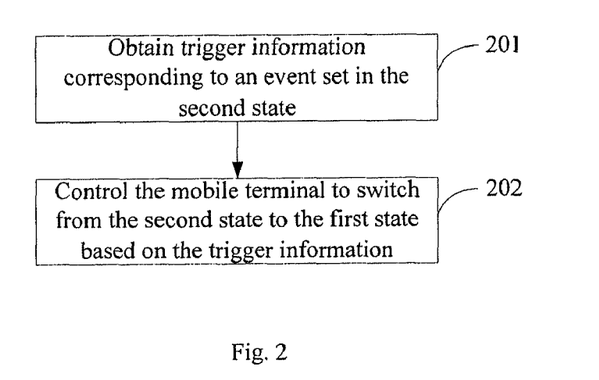
FIG. 2 is a flowchart illustrating the method for switching states of a mobile terminal according to the first embodiment of the present invention.

FIG. 2 illustrates the flowchart of the method for switching states of a mobile terminal according to the first embodiment of the present invention, which shows a process of the mobile terminal switching from the second state to the first state.

At step 201, trigger information corresponding to an event set is obtained in the second state.

Specifically, when the event set comprises at least one of a request to switch to the first state by interaction on a man machine interface and a receipt of a mail, the trigger information is information for triggering the mobile terminal to switch to the first state.

At step 202, the mobile terminal is controlled to switch from the second state to the first state based on the trigger information.

Upon determining that the operation state indicated by the trigger information corresponding to the event set is the first state, the mobile terminal turns on the application processor, sets the communication processor as a slave device of the application processor, and switches from an input/output device controlled by the communication processor to an input/output device controlled by the application processor.

Here, the input/output device controlled by the application processor and the input/output device controlled by the communication processor are multiplexed input/output device, partially multiplexed input/output device, or input/output devices independent of each other.

Figure 3:
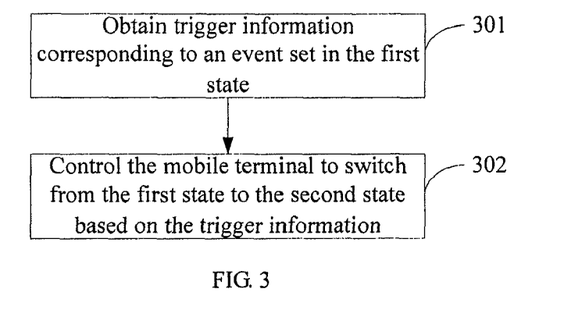
FIG. 3 is a flowchart illustrating the method for switching states of a mobile terminal according to the second embodiment of the present invention.

FIG. 3 illustrates the flowchart of the method for switching states of a mobile terminal according to the second embodiment of the present invention, which shows a process of the mobile terminal switching from the first state to the second state.

At step 301, trigger information corresponding to an event set is obtained in the first state.

Specifically, when the event set comprises at least one of a request to switch to the second state by interaction on a man machine interface and a determination that a timer exceeds a threshold, the trigger information is information for triggering the mobile terminal to switch to the second state.

At step 302, the mobile terminal is controlled to switch from the first state to the second state based on the trigger information.

Upon determining that the operation state indicated by the trigger information corresponding to the event set is the second state, the mobile terminal turns off the application processor, sets the communication processor as a master device, and switches from an input/output device controlled by the application processor to an input/output device controlled by the communication processor.

Here, the input/output device controlled by the application processor and the input/output device controlled by the communication processor are multiplexed input/output device, partially multiplexed input/output device, or input/output devices independent of each other.

Figure 4:
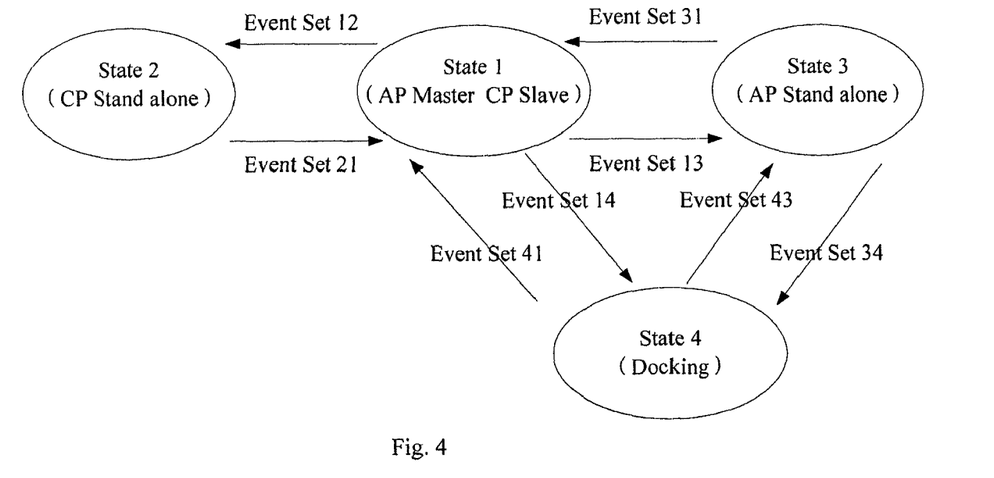
FIG. 4 is a schematic diagram illustrating the switching of states according to the method for switching states of a mobile terminal of the present invention.

FIG. 4 is a schematic diagram illustrating the switching of states according to the method for switching states of a mobile terminal according to the present invention. In FIG. 4, state 1 is a state in which both the application processor and the communication processor operate, with the application processor being a master device and the communication processor being a slave device; state 2 is a state in which only the communication processor is in control; state 3 is a state in which only the application processor is in control; and state 4 is a special state, docking state, in which an extension means including a peripheral device interface is connected, and the application processor is still in control.

The mobile terminal can be switched between state 1 and state 2, between state 1 and state 3, between state 1 and state 4 or between state 3 and state 4. For switching from state 1 to state 2, it is required to trigger an event set 12 which comprises a request to switch to state 2 by interaction on a man machine interface or a determination that a timer set for state 1 exceeds a threshold. For switching from state 2 to state 1, it is required to trigger an event set 21 which comprises a request to switch to state 1 by interaction on a man machine interface, a receipt of a particular number of mails or a trigger of a flip operation of a flip mobile terminal. For switching between state 1 and state 3, it is required to trigger an event set 13 or an event set 31 which can comprise a request to switch to state 3 or state 1 by interaction on a man machine interface, respectively. For switching from state 1 or 3 to state 4, it is required to trigger an event set 14 or an event set 34 which can comprise a detection of connection of the extension means. The extension means can comprise a variety of peripheral device interfaces which can connect various peripheral devices, such as a mouse, a keyboard, an Ethernet or a display.

Figure 5:
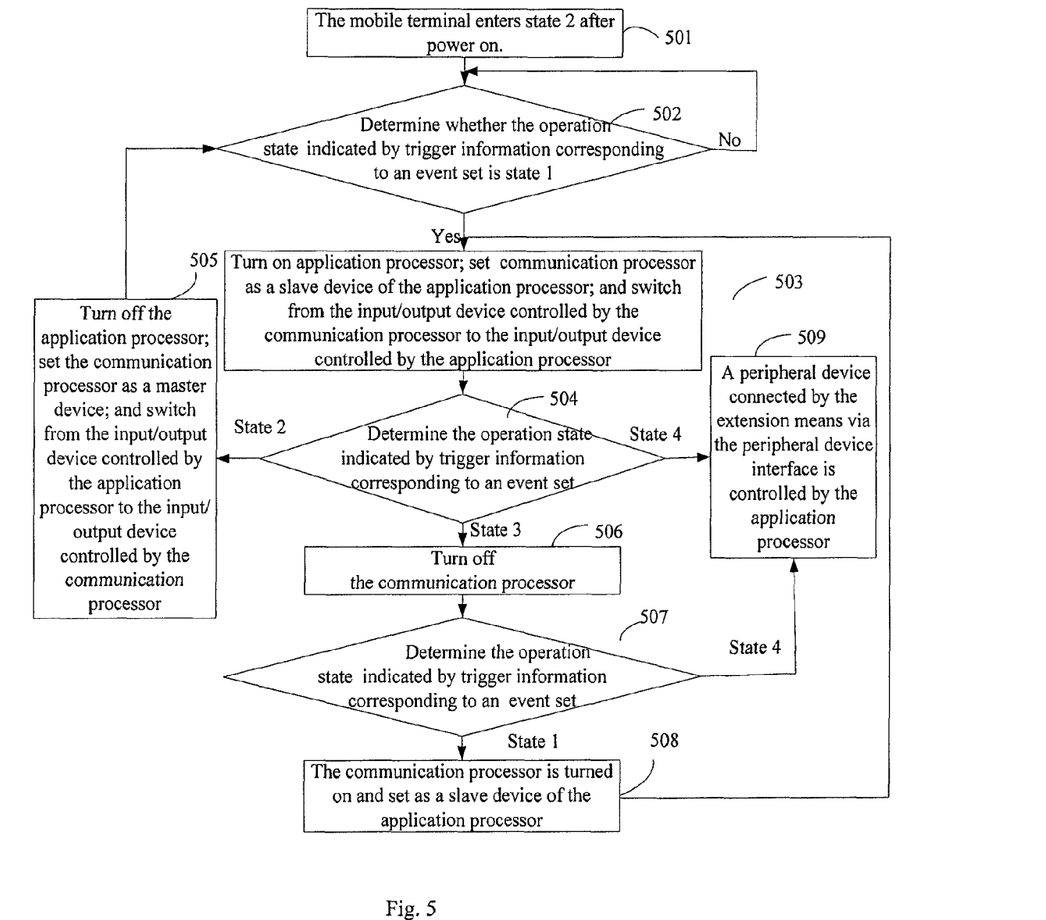
FIG. 5 is a flowchart illustrating the method for switching states of a mobile terminal according to the third embodiment of the present invention.

FIG. 5 is a flowchart illustrating, in conjunction with the above schematic diagram of the switching of states shown in FIG. 4, the method for switching states of a mobile terminal according to the third embodiment of the present invention. This embodiment describes in detail the process of switching states in the mobile terminal, beginning with the mobile terminal entering state 2 after power on.

At step 501, the mobile terminal enters state 2 after power on.

After being powered on, the mobile terminal enters state 2 in which the communication processor operates alone. In this state, users' demands on communication functions can be satisfied, and the mobile terminal can stay in a standby mode for a long duration. Thus, in state 2, the power consumption of the mobile terminal is lower, and the advantage of low power consumption of the communication processor can be fully utilized.

At step 502, it is determined whether the operation state indicated by trigger information corresponding to an event set is state 1 or not. If so, the process proceeds to step 503; otherwise, the process returns to step 502.

In state 2, the communication processor determines whether there is the event set 21, for example, whether there is a request to switch to state 1 by interaction on a man machine interface, a receipt of a particular number of mails or a flip operation of the mobile terminal. Here, the operation state indicated by the trigger information corresponding to the event set 21 is state 1.

At step 503, the application processor is turned on, the communication processor is set as a slave device of the application processor, and the input/output device controlled by the communication processor is switched to the input/output device controlled by the application processor.

Because the operation state indicated by the trigger information corresponding to the event set is state 1, the application processor is required to perform functions with high computation capability and is thus turned on. On the other hand, the communication processor still needs to operate, and is thus set as a slave device of the application processor. The communication processor functions in a way similar to an input/output device. State 1 is compatible with a state of an existing mobile terminal in which both of the application and communication processors are turned on.

The input/output device controlled by the application processor and the input/output device controlled by the communication processor can be multiplexed input/output device, partially multiplexed input/output device, or input/output devices independent of each other. In order to switch to state 1, it is also necessary to switch from the input/output device controlled by the communication processor to the input/output device controlled by the application processor.

In state 2, the input/output device to which the communication processor is connected may comprise a keyboard, a display device, a USB port and the like. In state 2, the input/output device to which the application processor is connected may comprise a storage device, a display device, an audio device, a USB interface and the like, and the communication processor also functions as an input/output device of the application processor. The input/output devices connected to the communication processor and to the application processor can be switched by a switching device.

At step 504, the operation state indicated by trigger information corresponding to an event set is determined. If the state is determined as state 2, the process proceeds to step 505. If the state is determined as state 3, the process proceeds to step 506. Otherwise, if the state is determined as state 4, the process proceeds to step 509.

In state 1, the application processor determines whether there is the event set 12, for example, whether there is a request to switch to state 2 by interaction on a man machine interface, or whether a set timer exceeds a threshold. The application processor also determines whether there is the event set 13, for example, whether there is a request to switch to state 3 by interaction on a man machine interface, or whether there is the event set 14, for example, whether a connection of an extension means comprising various peripheral device interfaces is detected.

At step 505, the application processor is turned off, the communication processor is set as a master device, and the input/output device controlled by the application processor is switched to the input/output device controlled by the communication processor. The process then returns to step 502.

Because the operation state indicated by the trigger information corresponding to the event set is state 2, the communication processor alone is sufficient to satisfy communication requirements. Thus, the application processor is turned off to reduce the power consumption of the system. Further, in state 2, the communication processor is set as the master device. For switching to state 2, it is also necessary to switch from the input/output device controlled by the application processor to the input/output device controlled by the communication processor. Again, the input/output device controlled by the application processor and the input/output device controlled by the communication processor can be multiplexed input/output device, partially multiplexed input/output device, or input/output devices independent of each other.

At step 506, the communication processor is turned off.

Because the operation state indicated by the trigger information corresponding to the event set is state 3, there is no need for the communication processor with communication functions, and only the application processor is needed to perform functions with high computation capability. Since both of the processors have been turned on during state 1, it is now necessary to turn off the communication processor, and the application processor remains in an operating state.

In state 3, no wireless data transmission is performed over Radio Frequency by the mobile terminal, since the communication processor has been turned off. Therefore, no radio frequency interference will be imposed on other devices which are conducting wireless data transmission.

At step 507, the operation state indicated by trigger information corresponding to an event set is determined. If the state is determined as state 1, the process proceeds to step 508. Otherwise, if the state is determined as state 4, the process proceeds to step 509.

In state 3, the application processor determines whether there is the event set 31, such as whether there is a request to switch to state 1 by interaction on a man machine interface, or whether there is the event set 34, such as whether a connection of an extension means comprising various peripheral device interfaces is detected.

At step 508, the communication processor is turned on and set as a slave device of the application processor. The process then returns to step 504.

Because the operation state indicated by the trigger information corresponding to the event set is state 1, the communication processor is needed to perform communication function and is thus turned on. The communication processor is set as a slave device of the application processor as the latter is still on.

At step 509, a peripheral device connected by the extension means via the peripheral device interface is controlled by the application processor.

Because the operation state indicated by the trigger information corresponding to the event set is state 1, it is indicated that the mobile terminal is connected with an extension means which generally has a variety of peripheral device interfaces for connecting various peripheral devices, such as a mouse, a keyboard, a display or an Ethernet, to enable the user to implement personal computer (PC) functions on the mobile terminal.

In state 4, after the extension means is unplugged from the mobile terminal, the mobile terminal transits to the state before the extension means is plugged, that is, transits to state 1 or 3 in which the application processor is in control.

Figure 6:
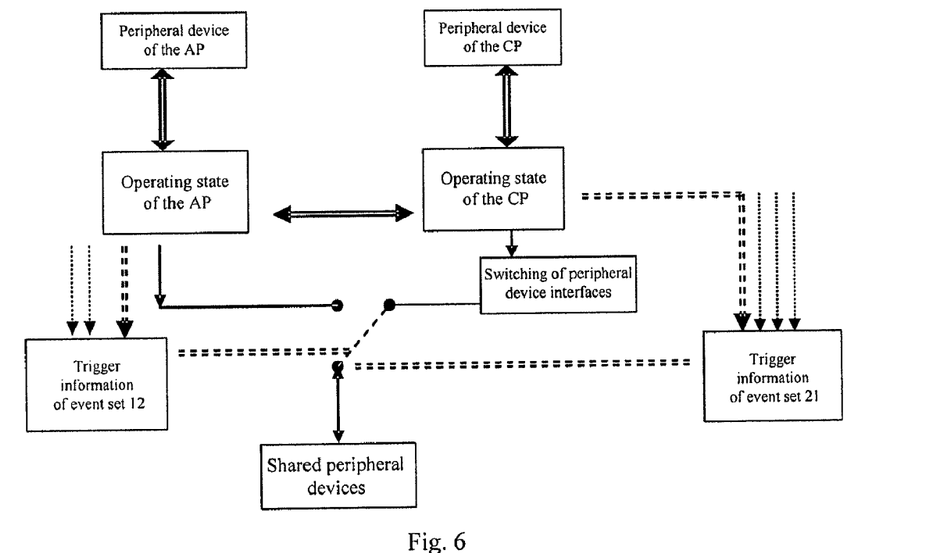
FIG. 6 is a schematic diagram illustrating hardware structure of the mobile terminal according to the present invention.

FIG. 6 is a schematic diagram illustrating hardware structure of the mobile terminal according to the present invention. Here each of the AP and the CP has its dedicated peripheral devices in its operating state. In addition, the AP and the CP have multiplexed shared peripheral devices. Taking the switching between state 1 and state 2 as an example, when the mobile terminal is in state 1, it is triggered to switch to state 2 by the event set 12. In this case, the AP is turned off, and the switching device for a shared peripheral device controlled by the AP is switched, such that the shared peripheral device can be switched, via the peripheral device interface, to be controlled by the CP. In this way, switching from state 1 to state 2 is achieved. Similarly, when the mobile terminal is in state 2, it is triggered to switch to state 1 by the event set 21. In this case, the switching device for the shared peripheral device controlled by the CP is switched, such that the shared peripheral device can be switched to be controlled by the AP. As such, the CP is connected to and controlled by the AP as its peripheral device.

Embodiments of the mobile terminal are also provided corresponding to the embodiments of the method for switching states of a mobile terminal. According to the present invention, the mobile terminal comprises a communication processor and an application processor in terms of hardware structure. Additionally, the operation states of the mobile terminal comprise: a first state in which both the application processor and the communication processor operate and the application processor is in control; a second state in which only the communication processor is in control; a third state in which only the application processor is in control; and a fourth state in which an extension means including a peripheral device interface is connected and the application processor is in control.

Figure 7:
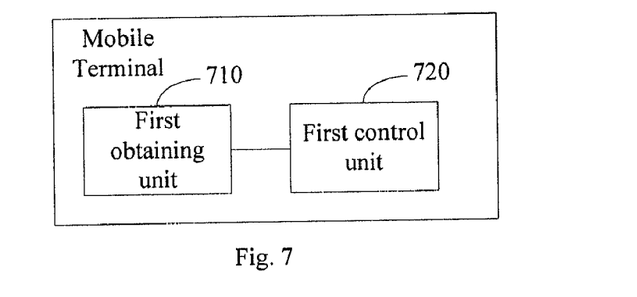
FIG. 7 is a block diagram of the mobile terminal according to the first embodiment of the present invention.

FIG. 7 is a block diagram of the mobile terminal according to the first embodiment of the present invention. The mobile terminal comprises a first obtaining unit 710 and a first control unit 720.

The first obtaining unit 710 is configured to obtain, in the second state, trigger information corresponding to an event set. The first control unit 720 is configured to control the mobile terminal to switch from the second state to the first state based on the trigger information.

Figure 8:
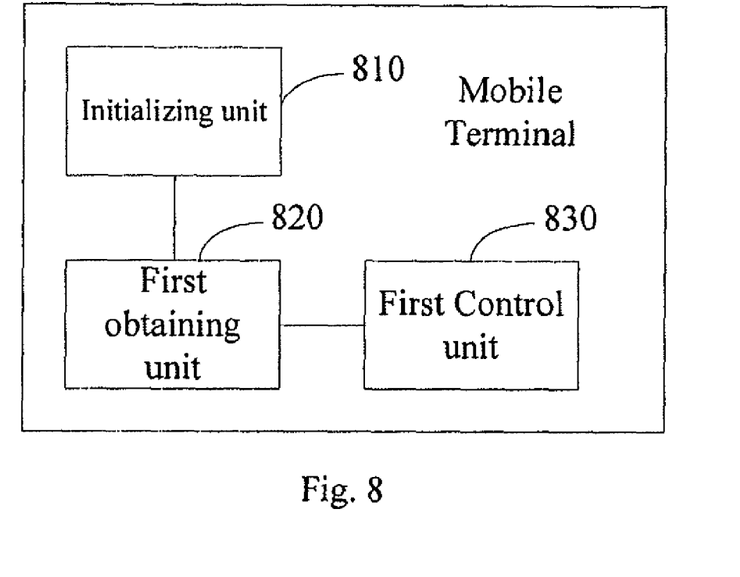
FIG. 8 is a block diagram of the mobile terminal according to the second embodiment of the present invention.

FIG. 8 is a block diagram of the mobile terminal according to the second embodiment of the present invention. The mobile terminal comprises an initializing unit 810, a first obtaining unit 820 and a first control unit 830.

The initializing unit 810 is configured to initialize the mobile terminal to enter the second state after initial power on. The first obtaining unit 820 is configured to obtain, in the second state, trigger information corresponding to an event set. The first control unit 830 is configured to control the mobile terminal to switch from the second state to the first state based on the trigger information.

In particular, the first control unit 830 may comprise the following units:

a first determining unit for, in the second state, when an event set comprises a request to switch to the first state by interaction on a man machine interface, a receipt of a mail or a trigger of a flip operation, determining that the operation state indicated by the trigger information corresponding to the event set is the first state; and a first switching unit for turning on the application processor, setting the communication processor as a slave device of the application processor, and switching from an input/output device controlled by the communication processor to an input/output device controlled by the application processor;

a second determining unit for, in the first state, when an event set is obtained in which switching to the third state is requested by interaction on a man machine interface, determining that the operation state indicated by the trigger information corresponding to the event set is the third state; and a second switching unit for turning off the communication processor;

a third determining unit for, in the third state, when an event set is obtained in which switching to the first state is requested by interaction on a man machine interface, determining that the operation state indicated by the trigger information corresponding to the event set is the first state; and a third switching unit for turning on the communication processor and setting the communication processor as a slave device of the application processor; and a fourth determining unit for, in the first state or the third state, when an event set is detected in which the extension means is connected, determining that the operation state indicated by the trigger information corresponding to the event set is the fourth state; and a fourth switching unit for controlling, by the application processor, a peripheral device connected by the extension means via the peripheral device interface.

Figure 9:
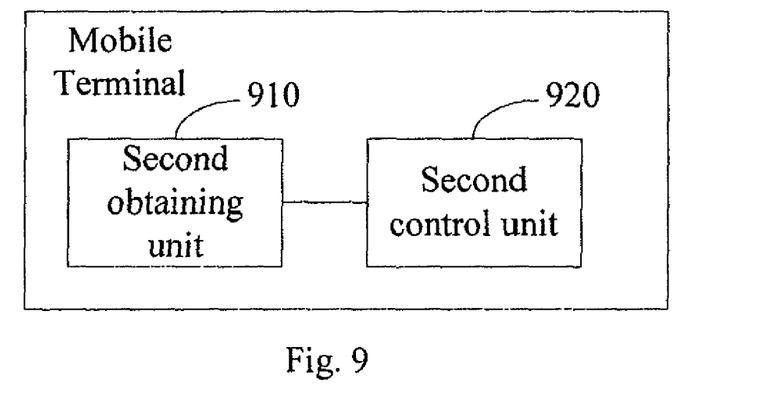
FIG. 9 is a block diagram of the mobile terminal according to the third embodiment of the present invention.

FIG. 9 is a block diagram of the mobile terminal according to the third embodiment of the present invention. The mobile terminal comprises a second obtaining unit 910 and a second control unit 920.

The second obtaining unit 910 is configured to obtain, in the first state, trigger information corresponding to an event set. The second control unit 920 is configured to control the mobile terminal to switch from the first state to the second state based on the trigger information.

In particular, the second controlling unit 920 may comprise the following units:

a determining unit for, in the first state, when an event set comprises a request to switch to the second state by interaction on a man machine interface or a determination that a timer exceeds a threshold, determining that the operation state indicated by the trigger information corresponding to the event set is the second state; and a switching unit for turning off the application processor, setting the communication processor as a master device, and switching from an input/output device controlled by the application processor to an input/output device controlled by the communication processor.

It can be seen from the above description of the embodiments, the mobile terminal according to the present invention can switch to a state in which only the communication processor is in control by obtaining the trigger information corresponding to an event set. In such a state, the system power consumption caused by the application processor can be effectively reduced, since operations does not rely on the application processor and the processing functions of the communication processor can be utilized alone.

It is obvious to those skilled in the art that the present invention can be implemented in software plus necessary general hardware platform. In light of this, the technical solutions of the present invention or the contribution can be substantially embodied in software product, which can be stored on storage medium such as a ROM/RAM, a magnetic disk and an optical disk. The software product comprises instructions which cause a computer (which can be a personal computer, a server, a network device or the like) to perform the method according to various embodiments or parts of the embodiments of the present invention.

The foregoing is intended to describe the embodiments of the present invention, rather than limiting the scope thereof. Any modifications, alternatives and improvements made without departing from the spirit and principle of the present invention fall in the scope of the present invention.

What is claimed is:

1. A method for switching states of a mobile terminal, wherein the mobile terminal comprising a communication processor and an application processor, and having four operation states, wherein a state in which only the communication processor is in control is defined as a second state, and a state in which both the application processor and the communication processor operate and the application processor is in control is defined as a first state, a state in which only the application processor is in control is defined as a third state, and a state in which an extension means including a peripheral device interface is connected and the application processor is in control is defined as a fourth state, the mobile terminal can be switched among the four operation states, the method comprising:

upon obtaining, in the second state, trigger information corresponding to an event set, switching the mobile terminal from the second state to the first state based on a determination that the trigger information indicates the first state;

upon obtaining, in the first state, trigger information corresponding to an event set, switching the mobile terminal from the first state to the third state based on a determination that the trigger information indicates the third state, wherein the communication processor is turned off;

upon obtaining, in the third state, trigger information corresponding to an event set, switching the mobile terminal from the third state to the first state based on a determination that the trigger information indicates the first state, wherein the communication processor is turned on and set as a slave device of the application processor;

upon obtaining, in the first state or the third state, trigger information corresponding to an event set, switching the mobile terminal from the first state or the third state to the fourth state based on a determination that the trigger information indicates the fourth state, wherein a peripheral device connected by the extension means via the peripheral device interface is controlled by the application processor wherein in the first state or the third state, when it is detected that the extension means is connected, determination is made that the operation state indicated by the trigger information corresponding to the event set is the fourth state, and the mobile terminal is switched from the first state or the third state to the fourth state; and in the fourth state, when it is detected that the extension means is disconnected, and the mobile terminal is returned from the fourth state to the first state or the third state which is the state before the extension means is connected.

2. The method of claim 1, further comprising:
entering, by the mobile terminal, the second state after initial power on.

3. The method of claim 1, wherein the trigger information corresponding to the event set obtained in the second state comprises a request to switch to the first state by interaction on a man machine interface, a receipt of a mail or a trigger of a flip operation; and wherein the step of switching the mobile terminal from the second state to the first state comprises:

turning on the application processor, setting the communication processor as a slave device of the application processor, and switching from an input/output device controlled by the communication processor to an input/output device controlled by the application processor.

4. The method of claim 3, wherein the input/output device controlled by the application processor and the input/output device controlled by the communication processor are multiplexed input/output device, partially multiplexed input/output device, or input/output devices independent of each other.

5. The method of claim 3, wherein in the first state, when an event set is obtained in which switching to the third state is requested by interaction on a man machine interface, determination is made that the operation state indicated by the trigger information corresponding to the event set is the third state.

6. The method of claim 5, wherein in the third state, when an event set is obtained in which switching to the first state is requested by interaction on a man machine interface, determination is made that the operation state indicated by the trigger information corresponding to the event set is the first state.

7. A mobile terminal comprising:
a communication processor; and
an application processor;
the mobile terminal has four operation states, a state in which only the communication processor is in control is defined as the second state, a state in which both the application processor and the communication processor operate and the application processor is in control is defined as the first state, a state in which only the application processor is in control is defined as a third state, and a state in which an extension means including a peripheral device interface is connected and the application processor is in control is defined as a fourth state,
the mobile terminal can be switched among the four operation states,
the mobile terminal further comprises a switching unit configured to:

upon obtaining, in the second state, trigger information corresponding to an event set, switching the mobile terminal from the second state to the first state based on a determination that the trigger information indicates the first state;

upon obtaining, in the first state, trigger information corresponding to an event set, switching the mobile terminal from the first state to the third state based on a determination that the trigger information indicates the third state, wherein the communication processor is turned off;

upon obtaining, in the third state, trigger information corresponding to an event set, switching the mobile terminal from the third state to the first state based on a determination that the trigger information indicates the first state, wherein the communication processor is turned on and set as a slave device of the application processor;

upon obtaining, in the first state or the third state, trigger information corresponding to an event set, switching the mobile terminal from the first state or the third state to the fourth state based on a determination that the trigger information indicates the fourth state, wherein a peripheral device connected by the extension means via the peripheral device interface is controlled by the application processor;

wherein in the first state or the third state, when it is detected that the extension means is connected, determination is made that the operation state indicated by the trigger information corresponding to the event set is the fourth state, and the mobile terminal is switched from the first state or the third state to the fourth state; and in the fourth state when it is detected that the extension means is disconnected, and the mobile terminal is returned from the fourth state to the first state or the third state which is the state before the extension means is connected.

8. The mobile terminal of claim 7, further comprising:
an initializing unit for initializing the mobile terminal to enter the second state after initial power on.

9. The mobile terminal of claim 7, wherein in the second state, when an event set comprises a request to switch to the first state by interaction on a man machine interface, a receipt of a mail or a trigger of a flip operation, determination is made that the operation state indicated by the trigger information corresponding to the event set is the first state; and
the switching unit is configured to turn on the application processor, set the communication processor as a slave device of the application processor, and switch from an input/output device controlled by the communication processor to an input/output device controlled by the application processor.

10. The mobile terminal of claim 9, wherein in the first state, when an event set is obtained in which switching to the third state is requested by interaction on a man machine interface, determination is made that the operation state indicated by the trigger information corresponding to the event set is the third state.

11. The mobile terminal of claim 10, wherein in the third state, when an event set is obtained in which switching to the first state is requested by interaction on a man machine interface, determination is made that the operation state indicated by the trigger information corresponding to the event set is the first state.

* * * * *